(12) United States Patent
Nyfelt

(10) Patent No.: US 9,759,349 B2
(45) Date of Patent: Sep. 12, 2017

(54) TUBE WITH TAG AND METHOD FOR SERVICING THE TUBE

(71) Applicant: CEJN AB, Skövde (SE)

(72) Inventor: Leif Nyfelt, Skövde (SE)

(73) Assignee: CEJN AB, Skövde (SE)

( * ) Notice: Subject to any disclaimer, the term of this patent is extended or adjusted under 35 U.S.C. 154(b) by 0 days.

(21) Appl. No.: 15/025,050

(22) PCT Filed: Sep. 30, 2014

(86) PCT No.: PCT/EP2014/070910
§ 371 (c)(1),
(2) Date: Mar. 25, 2016

(87) PCT Pub. No.: WO2015/044451
PCT Pub. Date: Apr. 2, 2015

(65) Prior Publication Data
US 2016/0208957 A1    Jul. 21, 2016

(30) Foreign Application Priority Data
Sep. 30, 2013  (GB) .................................. 1317246.5

(51) Int. Cl.
*F16L 55/00* (2006.01)
*F16L 1/11* (2006.01)
(Continued)

(52) U.S. Cl.
CPC ............... *F16L 1/11* (2013.01); *F16L 11/124* (2013.01); *G01V 15/00* (2013.01); *G06K 19/07758* (2013.01); *F16L 2201/60* (2013.01)

(58) Field of Classification Search
USPC .................................................. 138/104, 109
See application file for complete search history.

(56) References Cited

U.S. PATENT DOCUMENTS 5,036,210 A * 7/1991 Goodman ........... B29C 47/0019
138/104
5,243,128 A * 9/1993 Marcoz .................. B65H 61/00
138/104
(Continued)

FOREIGN PATENT DOCUMENTS

CN      1920901 A     2/2007
CN    101965603 A     2/2011
(Continued)

OTHER PUBLICATIONS

Untermann, Nils, "International Search Report," prepared for PCT/EP2014/070910, as mailed Dec. 4, 2014, four pages.

Primary Examiner — James Hook
(74) Attorney, Agent, or Firm — Winstead PC

(57) ABSTRACT

A tube comprising a tag (30). The tag (30) comprising tube service data and at least one more data of the following group of data: tube identification data, tube manufacture data, and tube operation data. The tag (30) allows the data to be read, written, and updated electronically, and the tag (30) provides data for servicing the tube (10). A method for servicing such a tube, the method comprising: providing the tag (30) on the tube (10); reading electronically the data from the tag (30) for servicing the tube (10); servicing the tube (10) according to the data read; and writing electronically the data to the tag (30) to update at least the tube service data.

13 Claims, 1 Drawing Sheet

(51) Int. Cl.
  *F16L 11/12* (2006.01)
  *G01V 15/00* (2006.01)
  *G06K 19/077* (2006.01)

(56) References Cited

U.S. PATENT DOCUMENTS

| | | | |
|---|---|---|---|
| 7,387,012 B2* | 6/2008 | Spaolonzi | G01M 3/047 |
| | | | 138/104 |
| 7,557,716 B2 | 7/2009 | Morbitzer et al. | |
| 7,616,119 B2 | 11/2009 | Corbett, Jr. | |
| 8,742,942 B2* | 6/2014 | Rosen | F17D 5/06 |
| | | | 138/104 |
| 8,844,577 B2* | 9/2014 | Kiest, Jr. | F16L 55/1653 |
| | | | 138/104 |
| 9,038,670 B2* | 5/2015 | Vinoy | F16L 1/11 |
| | | | 138/104 |
| 2004/0232924 A1* | 11/2004 | Hilleary | C23F 13/22 |
| | | | 324/700 |
| 2007/0057769 A1 | 3/2007 | Corbett | |
| 2011/0030875 A1* | 2/2011 | Conte | G01V 15/00 |
| | | | 156/64 |
| 2011/0187556 A1* | 8/2011 | Roddy | G01V 3/00 |
| | | | 340/853.3 |
| 2011/0315261 A1* | 12/2011 | Coleman | E21B 17/006 |
| | | | 138/104 |
| 2012/0097284 A1* | 4/2012 | Hudson | F16L 11/124 |
| | | | 138/104 |
| 2012/0297652 A1 | 11/2012 | Halvorsen | |
| 2013/0056538 A1 | 3/2013 | Binmore | |
| 2013/0061971 A1* | 3/2013 | Chamberland | F16L 9/125 |
| | | | 138/104 |
| 2013/0284299 A1* | 10/2013 | Schooley | F16L 55/00 |
| | | | 138/104 |
| 2014/0130928 A1* | 5/2014 | Drouin | B65D 59/06 |
| | | | 138/104 |
| 2014/0137953 A1* | 5/2014 | Gibb | F17C 1/00 |
| | | | 137/351 |

FOREIGN PATENT DOCUMENTS

| | | |
|---|---|---|
| CN | 102510968 A | 6/2012 |
| EP | 0408320 A2 | 1/1991 |
| EP | 1772659 A2 | 4/2007 |
| EP | 2395458 A1 | 12/2011 |
| GB | 2473177 A | 3/2011 |
| JP | 2002098774 | 4/2002 |
| JP | 2005143997 | 6/2005 |
| JP | 2006083959 | 3/2006 |
| JP | 2008310167 | 12/2008 |
| JP | 2010249567 | 11/2010 |
| JP | 2011089600 | 5/2011 |
| KR | 20110080409 A | 7/2011 |
| WO | WO-0079239 A1 | 12/2000 |
| WO | WO-2010106302 A1 | 9/2010 |
| WO | WO-2011059342 A2 | 5/2011 |
| WO | WO-2011073657 A2 | 6/2011 |
| WO | WO-2013057059 A1 | 4/2013 |

* cited by examiner

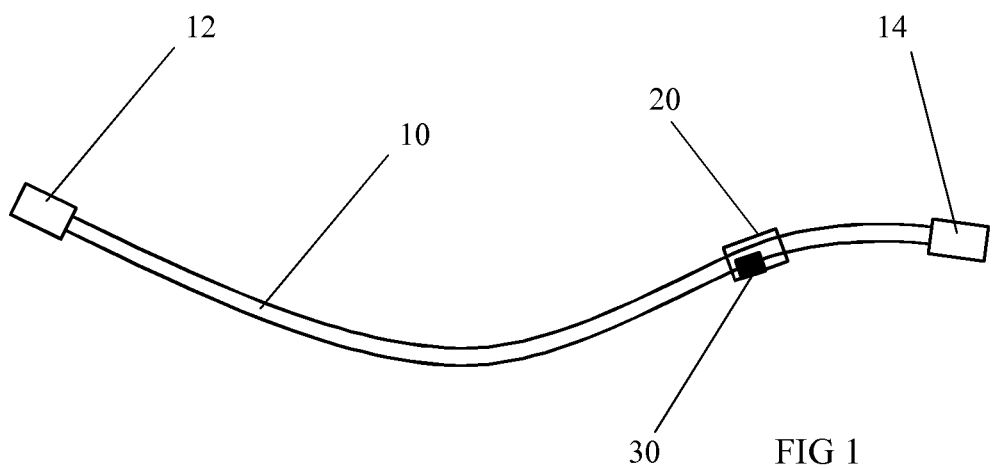
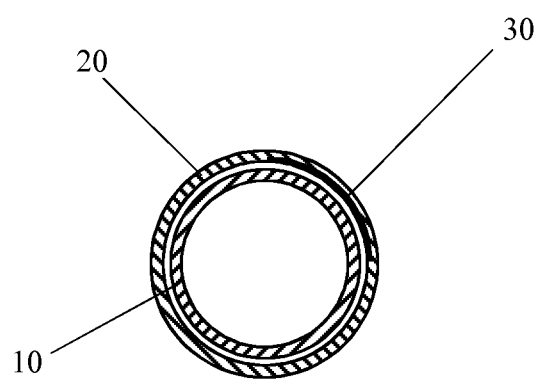

TUBE WITH TAG AND METHOD FOR SERVICING THE TUBE

TECHNICAL FIELD

The disclosure relates to a tube comprising a tag and a method of servicing such a tube. More specifically, the method and tube concerns pressurised tubes for fluids and how to service the tube and preferable one or more couplings on the tube.

BACKGROUND

Pressure tubes are normally tubes that can take pressures higher than normal atmospheric pressure, normally up to several thousand times the atmospheric pressure. Such pressurised tubes are subject to strict safety regulations. A faulty tube ejecting high pressure fluid could cut of a limb of staff handling the tube. Tubes must be serviced, e.g. tested and inspected, according to regulations and can only be used for certain purposes, pressures, and time. It is desirable to provide a method to ensure correct and safe service and handling of a tube.

Currently tubes are marked with bar codes, colour labels, sheet metal, or plastic tags with stamped information. Such marking is typically an identification number, a product code, of the tube. It is a technical problem that such marking does not contain enough information and there is no international standard for such information. The information is limited to the physical size of the marked area. It is a technical problem to provide a marking that can be read in many different languages and areas of the world.

A further technical problem is that any marking should also fit and work together with already existing tubes. The marking should be part of the tube, but the cost of a marking is small in relation to the cost of the tube and any of its couplings. Therefore, it is desirable that the marking is not expensive to make. It is further a technical problem to avoid cumbersome arrangement and/or arrangements that are expensive to manufacture.

There is a desire to be able to provide a marking to a tube that can be read from the tube at different places along the tube. A marking is fixed to the tube at a certain position and that position may not be viewable because of the environment that the tube is in. For example, the part of the tube with the marking is inside a machine and therefore the marking can not be read.

The present invention is directed to overcoming one or more of the problems as set forth above.

SUMMARY

It is an object of the present invention to provide a tube, with one or more couplings, comprising a tag and a method for servicing such a tube with one or more couplings. This object can be achieved by the features as defined in the independent claims. Further enhancements are characterized in the dependent claims.

According to one embodiment, a tube comprises a tag, the tag being configured to comprise tube service data and at least one more data of the following group of data: tube identification data, tube manufacture data, and tube operation data. The tag being configured to allow the data to be read, written, and updated electronically; and the tag is configured to provide data for servicing the tube. Such a tube comprises one or more couplings. The tag (30) is further configured to comprise data for servicing the one or more couplings (12, 14) and at least one more data of the following group of data: coupling identification data, coupling manufacture data, and coupling operation data. The tag (30) is further configured to provide data for servicing the one or more couplings (12, 14). The tag can be one or more tags. The tag may be a radio-frequency identification (RFID) tag or a near field communication (NFC) tag.

According to one embodiment, a method for servicing such a tube with one or more couplings is disclosed. The method comprises providing the tag on the tube; reading electronically the data from the tag for servicing the tube and the one or more couplings; servicing the tube and the one or more couplings according to the data read; and writing electronically data to the tag to update at least the tube service data.

At least one of the above embodiments provides that the tube can be serviced based on the data that the tube has on the tag. This allows a user of the tube to know, for example, when it is time for what kind of service of the tube and any couplings on the tube, and when the last service was made and its result. This may result in a safer use of the tube and any couplings. It may allow a user the possibility to find out how to use the tube and couplings and what their technical and physical limitations are. Further advantages and technical effects of the embodiments are described below.

At least one of the above embodiments provides one or more solutions to the problems and disadvantages with the background art. Other technical advantages of the present disclosure will be readily apparent to one skilled in the art from the following description and claims. Various embodiments of the present application obtain only a subset of the advantages set forth. No one advantage is critical to the embodiments. Any claimed embodiment may be technically combined with any other claimed embodiment(s).

BRIEF DESCRIPTION OF THE DRAWINGS

The accompanying drawings illustrate presently preferred exemplary embodiments of the disclosure, and together with the general description given above and the detailed description of the preferred embodiments given below, serve to explain, by way of example, the principles of the disclosure.

FIG. 1 is a diagrammatic illustration of a tube according to an exemplary embodiment of the present disclosure.

FIG. 2 is a diagrammatic illustration of a tube according to an exemplary embodiment of the present disclosure.

DETAILED DESCRIPTION

FIG. 1 illustrates schematically a tube (10) with a coupling (12, 14) at each end. The tube (10) may be a pressurised tube (10). The pressure may be higher than the atmospheric pressure. For example, the tube (10) may be a high pressure tube (10) for several thousand times the atmospheric pressure, e.g. more than 350 bar. The couplings (12, 14) may be quick connect couplings (12, 14) allowing a fluid source to be connected to, for example, a tool by the tube (10). A cylinder (20) may be arranged around the tube (10). The cylinder may be slidable arranged on the tube (10). The cylinder (20) may comprise a tag (30). The tag (30) may be a near field communication (NFC) tag (30). While only one tag (30) is illustrated, the tube (10) may comprise a plurality of tags (30). In FIG. 1 the cylinder (20) is, as an example, a transparent piece of tube arranged around the tube (10) and is limited by the couplings (12, 14) so that the tag (30) can not be separated from the tube (10).

FIG. 2 illustrates schematically a cut in the radial direction through the cylinder (20), the tag (30), and the tube (10) viewed along the axial direction of the tube (10). It may be taken from FIG. 2 that there is space between the cylinder (20) and the tube (10) and this allows the cylinder (20) to move along the tube (10) in its axial direction. Hereby the tag (30) can be moved along the tube (10) to a convenient location along the tube (10) so that the tag (30) can be accessed. In this way tag (30) can be moved to a suitable place along the tube (10) so that data can be read of the tag (30) and/or data can be written to the tag (30). The tag (30) may be located on the inside of the cylinder (20) so that the tag (30) is protected.

According to one embodiment, a tube (10) comprises a tag (30) as illustrated in FIGS. 1 and 2. The tag (30) comprises tube service data and at least one more data of the following group of data: tube identification data, tube manufacture data, and tube operation data. The tag (30) allows the data to be read, written, and updated electronically. The tag (30) provides data for servicing the tube (10).

According to one embodiment, the tag (30) may be a radio-frequency identification (RFID) tag or a near field communication (NFC) tag. The tag (30) may be an active tag, or a semi active tag, or a passive tag. The tag (30) may be read or written to using conventional means such as a mobile phone. The tag (30) can be read or written to or updated directly. In this way all the data is on the tag (30). The tag (30) can be read or written to or updated indirectly. In this way all, or some of, the data is on the tag (30). The tag (30) may for example provide a URL link to further data and the possibility to update such further data.

According to one embodiment, the tube (10) may further comprises one or more couplings (12, 14), and the tag (30) may further comprise data for servicing the one or more couplings (12, 14) and at least one more data of the following group of data: coupling identification data, coupling manufacture data, and coupling operation data. The tag (30) may further provide data for servicing the one or more couplings (12, 14) as an alternative or in addition to the tube (10).

According to one embodiment, the tube (10) may be a pressurised tube. The pressure may be higher than atmospheric pressure. For example, the tube (10) may be a high pressure tube (10) for several hundred or thousand times the atmospheric pressure. For example, the tube and one or more couplings may be configured for more than 350 bar.

According to one embodiment, the tag (30) is arranged on a cylinder (20), the cylinder surrounding at least a part of the tube (10). The cylinder (20) may be in the shape and form of a sleeve. The cylinder (20) may be able to slide along the tube (10). The cylinder (20) may for example be a transparent piece of tube. The cylinder (20) may be part of a protective cover for the tube (10) that covers, for example, the entire length of the tube (10). The cylinder (20) may be limited by the couplings (12, 14) so that the cylinder (20) can not be removed from the tube (10). In this way the cylinder (20) is attached to the tube (10) by the tube (10) itself and the couplings (12, 14).

According to one embodiment, the tag (30) may be arranged on the inside of the cylinder (20). This arrangement is to protect the tag (30). In this way the tag (30) can be protected from the environment that the tube (10) is used in. In one embodiment, the tag (30) can be embedded in the cylinder (20). In one embodiment, the tag (30) may be arranged to the tube (10) by the use of adhesive tape, pressure sensitive tape. The adhesive tape may be illustrated by feature (20) in FIGS. 1 and 2.

According to one embodiment, the tag (30) and cylinder (20), or either the tag (30) or the cylinder (20), or the adhesive tape, comprise distinct visual text and/or markings. Such distinct visual text and/or markings may identify the tag (30) and inform, visually, a user of the existence of the tag (30). For example, the cylinder (20) may be made out of a fluorescent material. For example, the cylinder (20) may have a distinct colour, such a bright orange or red, so that it is easily noticed by a user of the tube (10). For example, the cylinder (20) may have a text written on it, such as "READ ME BEFORE USE", max pressure allowed, and/or expire date. By providing a distinct visual text or marking on the tag (30) or the cylinder (20) a user notice that there is important information and where it is.

By servicing a tube and/or couplings is meant very broadly taking care of and maintaining the tube and/or couplings. To service a tube, especially a pressurised tube, is very important to ensure proper working of the tube. The same applies for the one or more couplings to the tube. With this tag and the service data stored on the tag (comprised by the tube) the possibility to service and to ensure such service is technically solved. This includes, for example, making optical inspections of the tube and/or couplings. This includes, for example, making pressure tests of the tube and/or couplings. Such service may be prescribed and defined by law and health and safety regulations. The technical effect of having service data on a tag on the tube and/or couplings allows a user of the tube and couplings to, for example, know and ensure what service has been done, what and how and when service needs to be done. The technical improvements and effects alone with regard to health and safety are considerable and can be ensured by at least one embodiment described herein.

According to one embodiment, the service data is data relating to servicing the tube. The service data may also, or alternatively, relate to servicing the one or more couplings. Such service data may comprise:

Results of an optical inspection of the tube. For example, what kind of damage, has the tube been bent, ruptured, squeezed, scratched, scored, etc.

Results of an optical inspection of the coupling. For example, what kind of damage, has the coupling been damaged, works properly, leaks, scratched, etc.

When was the optical inspection done.

When is the next optical inspection due.

Results of a pressure test for the tube and/or coupling. For example, what kind of result, tube leaking, tube expanding, coupling leaking, etc.

When was the pressure test done.

When is the next pressure test due.

A certificate ensuring that a pressure test has been made and the result.

A tube (30) and/or couplings (12, 14) comprising a tag (10) with such service data may have one or more of the following technical effects. The tube and/or couplings are maintained properly, are tested when supposed to, safety regulations can be complied with, etc. The service data is travelling with the tube and/or couplings. It is easy to read and work with the tag since equipment for reading and writing NFC tags are readily available.

Previously tubes and/or couplings would not have such service data. A user could not tell when a tube and/or couplings were due for service and what the previous result was. However, with embodiments of the present disclosure, it is possible to service the tube and/or couplings based on the data of the tag.

According to one embodiment, the identification data is data relating to the identification of the tube (10). The identification data may also, or alternatively, relate to the identification of the one or more couplings (12, 14). Such identification data may comprise:

- What tube it is.
- What coupling it is.
- Product number and/or identification.
- What is connected to the tube, for example what couplings are connected to the tube.
- Expire date for the tube, as of which date the tube should not be used any more.
- Expire date for the coupling, as of which date the coupling or a part of the coupling should not be used any more.
- What maximum pressure is allowed for the tube and/or coupling.
- Length or diameter of the tube.
- Information concerning threaded connections to the tube.

A tube (30) and/or couplings (12, 14) comprising a tag (10) with such identification data may have one or more of the following technical effects. Product number or identification number may protect against incorrect copies of the tube and/or couplings. The tube and/or coupling can be identified. Tubes that are rented with couplings can be checked on return if the right couplings, or couplings at all, are returned.

According to one embodiment, the manufacture data is data relating to manufacturing the tube. The manufacture data may also, or alternatively, relate to manufacturing the one or more couplings. Such manufacture data may comprise:

- When the tube and/or the coupling was made.
- Where the tube and/or the coupling was made.
- Who has manufactured the tube and/or the coupling.
- To what batch number the tube and/or coupling belongs.
- Where to order a new replacement tube and/or coupling.
- How to order a new replacement tube and/or coupling.
- How to contact the manufacturer. For example, address information.
- A certificate ensuring the manufacturing specification of the tube and/or couplings.

A tube (30) and/or couplings (12, 14) comprising a tag (10) with such manufacture data may have one or more of the following technical effects. An identical replacement tube and/or couplings may be ordered. Spare parts can be ordered. Ordering correct parts may reduce liability problems with copies of inferior quality. The right replacement tube and/or couplings may be ordered. With the batch number it is possible to recall a complete batch that is faulty. It is possible to determine on site what tube and/or coupling it is. The manufacture data is travelling with the tube and/or couplings. It is easy to read and work with the tag since equipment for reading and writing NFC tags are readily available.

According to one embodiment, the operation data is data relating to operating the tube. The operation data may also, or alternatively, relate to operating the one or more couplings. Such operation data may comprise:

- A manual and/or instructions how to operate the tube and/or couplings. This can be provided in several different languages. This may be a movie.
- How to service the tube and/or coupling. For example, how to do the visual inspection and the pressure testing. How to identify damages and record it on the tag.
- Information, e.g. manufacture's contact information, how to get further information or help concerning the tube and/or coupling.
- Links to URL addresses with, for example, information concerning the manufacturer, tube, and/or coupling.
- This operation data may be in the form of a movie or animation.
- This operation data may be in different languages.

A tube (30) and/or couplings (12, 14) comprising a tag (10) with such operation data may have one or more of the following technical effects. The tube and/or couplings are maintained properly, are tested when supposed to, safety regulations can be complied with, etc. A manual how to use and operate will always be present with the tube and/or coupling. Such information may be present in several different languages. Such an operation manual, and-or such as how to perform a test or connect the couplings of the tube, may be stored or linked on the tag as a movie or animation. A "read-these-instructions-before-use" can be created ensuring proper and safe use of the tube and/or coupling. The operation data is travelling with the tube and/or couplings. It is easy to read and work with the tag since equipment for reading and writing NFC tags are readily available.

According to one embodiment, a method for servicing a tube (10) and/or the at least one or more couplings (12, 14) is disclosed. The method may comprise the following steps, taken in any order:

providing the tag (30) on the tube (10);

reading electronically the data from the tag (30) for servicing the tube (10) and/or the at least one or more couplings (12, 14);

servicing the tube (10) and/or the at least one or more couplings (12, 14) according to the data read; and writing electronically data to the tag (30) to update at least the tube service data and/or, preferably, the at least one or more couplings service data. Servicing the tube (10) and/or the at least one or more couplings (12, 14) may be done according to the data read and the instructions read. This makes it technically possible to service the tube and/or couplings because the data for servicing is available with the tube (10). The instructions, such as how and when, to do the service can be taken from the tube (10) via the tag (30). The results of the service can then be added to the tube (10). It may be possible to always check the tube (10) to ensure that the tube (10) is in order and complies with all its requirements. Further technical advantages from having service data, identification data, manufacture data, and/or operation data have been disclosed above.

According to one embodiment, reading and writing data to or from the tag (30) is done directly to the tag (30), or indirectly via the tag (30) to a remote memory. The remote memory can be part of a free standing computer, mobile phone, hand held computer device, or terminal that can display the data on the tag (30). This may allow for links to the remote memory, for example via the use of a URL, where data can be read and/or written and/or updated.

According to one embodiment, the tube and coupling service data is one or more data of the following group: data relating to optical inspection, data relating to physical tests, data relating to pressure tests, the time of optical inspections, the result of optical inspections, the time of physical tests, and the result of physical tests.

According to one embodiment, the tube and coupling identification data being one or more data of the following group: what tube it is, what coupling it is, product number and/or identification, expiry date for the tube, expiry date for the coupling, maximum pressure allowed, what kind of fluid allowed, and peripheral connections.

According to one embodiment, the tube and coupling manufacturing data is one or more data of the following group: when the tube and the coupling was made, where the tube and the coupling was made, who has manufactured the tube and the coupling, batch number of the tube and coupling, where to order a new replacement tube and coupling, how to order a new replacement tube and coupling, and how to contact the manufacturer.

According to one embodiment, the tube and coupling operation data is one or more data of the following group: a manual or instructions how to operate the tube and couplings, how to service the tube and coupling, how to do visual inspection, how to do physical tests, how to do pressure testing, how to identify damages, how to record it on the tag, information, manufacture contact information, how to get further information, how to get help concerning the tube and coupling, links to URL addresses, and this in different languages.

At least one embodiment ensures controlling a tubes identification, manufacturing documentation, guide to where and how to order a new one. Tracking is ensured and service maintenance. At least one embodiment ensures complete traceability of information about the hose and its manufacturer in multiple languages. It is thus possible to store all necessary information in several languages for tubes and/or couplings sold worldwide. At least one embodiment allows a user to scan or read data using a mobile phone and then quickly via SMS or email to order a replacement tube and/or couplings.

At least one embodiment provides a tag attached to a tube, a hose, that can not readily be removed or be affected by external factors such as weather, sun, or dirt. The tag allows reading and writing the tag in the environment where the tube is installed. The tag can be moved to a suitable place for that purpose along the tube.

At least one embodiment allows a user or a manufacturer, at any time, check the tube, the hose, using a mobile phone by holding the mobile phone over the tag that is attached to the hose. The mobile phone communicates wirelessly with the tag and collects all data concerning the tube and/or couplings. A mobile phone, or any other reader, may activate the tag.

At least one embodiment allows the collected data to be accessed. Such data may include, for example, data concerning the tube part number, length of the hose, threaded connection, the manufacturer's phone number, address, etc.

At least one embodiment allows to identify and compile information and data to a tube that is not new, but has been previously sold. In this way tubes can be subsequently labelled. It has become increasingly common in recent times to duplicate tube and tube products, such as couplings for example. For a user it is difficult to see what is an original tube and coupling and what is a copy. At least one embodiment allows to create an identification function that covers the whole world and that would prevent copying the tube and tube products.

As previously mentioned, the disclosure is not limited in its application with respect to a certain type of tube or hose, but can be applied to many other areas such as gas tubes, compressed air tubes, breathing air tubes, oil tubes, and tubes for acid.

At least one embodiment may provide a method for checking identification information and the like for a tube comprising a tag. The tag comprises all data about the tube and the company that manufactured the tube. After having placed the tube with the tag near a reader, information carried by the tag is received. The information may be stored in a database so that a user can get all the necessary data required for service, replacing the tube, and ordering a new tube.

It will be apparent to those skilled in the art that various modifications and variations can be made to the disclosed apparatus and method. Other embodiments will be apparent to those skilled in the art from consideration of the specification and practice of the disclosed apparatus and method. It is intended that the specification and examples be considered as exemplary only, with a true scope being indicated by the following claims and their equivalents.

The invention claimed is:

1. A tube safety system comprising:
   a tube;
   at least two couplings, the at least two couplings comprising a coupling connected to each end of the tube;
   wherein the tube and the at least two couplings are configured for pressure of more than 350 bar;
   a single tag arranged in relation to the tube and comprising updatable service data that indicates whether service is needed for safe use of the tube and the at least two couplings, the updatable service data comprising:
      tube service data related to at least an inspection and a testing of the tube; and
      coupling service data related to at least an inspection and a testing of the at least two couplings; and
   wherein the single tag is configured to:
      directly provide the updatable service data to a user of the tube; and
      allow the updatable service data to be read, written, and updated electronically.

2. The tube safety system according to claim 1, wherein the single tag is a radio-frequency identification (RFID) tag or a near field communication (NFC) tag.

3. The tube safety system according to claim 1, wherein the tube is a pressurised tube.

4. The tube safety system according to claim 1, wherein the single tag is arranged on a cylinder, the cylinder surrounding at least a part of the tube and able to slide along the tube.

5. The tube safety system according to claim 4, wherein the single tag is arranged on the inside of the cylinder to protect the single tag.

6. The tube safety system according to claim 4, wherein at least one of the single tag and the cylinder comprises at least one of distinct visual text and markings.

7. A method for servicing a tube with at least one coupling according to claim 1, the method comprising:
   providing the single tag on the tube;
   reading electronically the tube and coupling service data from the single tag for servicing the tube and the at least two couplings;
   servicing the tube and the at least two couplings according to the read data; and
   writing electronically data to the single tag to update at least the tube service data.

8. The method according to claim 7, wherein the tube and coupling service data each comprise at least one data of the following group: data relating to optical inspection, data relating to physical tests, data relating to pressure tests, time of optical inspections, result of optical inspections, time of physical tests, a certificate ensuring that a pressure test has been made and its result, and result of physical tests.

9. The method according to claim 7, wherein the single tag stores tube and coupling identification data, the tube and coupling identification data comprising at least one data of the following group: what tube it is, what coupling it is, product number and/or identification, expiry date for the tube, expiry date for the coupling, maximum pressure allowed, what kind of fluid allowed, length and diameter of the tube, information concerning threaded connections to the tube, and peripheral connections.

10. The method according to claim 7, wherein the single tag stores tube and coupling manufacturing data, the tube and coupling manufacturing data comprising at least one data of the following group: when the tube and the coupling was made, where the tube and the coupling was made, who has manufactured the tube and the coupling, batch number of the tube and coupling, where to order a new replacement tube and coupling, how to order a new replacement tube and coupling, a certificate ensuring manufacturing specification, and how to contact the manufacturer.

11. The method according to claim 7, wherein the single tag stores tube and coupling operation data, the tube and coupling operation data comprising at least one data of the following group: a manual or instructions how to operate the tube and couplings, how to service the tube and coupling, how to do visual inspection, how to do physical tests, how to do pressure testing, how to identify damages, how to record data on the single tag, information, manufacture contact information, how to get further information, how to get help concerning the tube and coupling, links to URL addresses, movies or animations of this operation data, and this operation data in different languages.

12. The method according to claim 7, wherein reading and writing data to or from the single tag is done directly to the single tag, or indirectly via the single tag to a remote memory.

13. A tube safety method comprising, by a single tag arranged in relation to a tube:
storing updatable service data that indicates whether service is needed for safe use of the tube and at least two couplings, the at least two couplings comprising a coupling connected to each end of the tube;
wherein the tube and the at least two couplings are configured for pressure of more than 350 bar;
wherein the updatable service data comprises
tube service data related to at least an inspection and a testing of the tube; and
coupling service data related to at least an inspection and a testing of the at least two couplings;
directly providing the updatable service data to a user of the tube; and
allowing the updatable service data to be read, written, and updated electronically.

* * * * *